(12) United States Patent
Miyoshi

(10) Patent No.: US 8,739,139 B2
(45) Date of Patent: May 27, 2014

(54) ALGORITHM SELECTION DEVICE AND ALGORITHM SELECTION METHOD

(75) Inventor: Ikuo Miyoshi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/337,762

(22) Filed: Dec. 27, 2011

(65) Prior Publication Data

US 2012/0167064 A1     Jun. 28, 2012

Related U.S. Application Data

(63) Continuation of application No. PCT/JP2009/062122, filed on Jul. 2, 2009.

(51) Int. Cl.
*G06F 9/45* (2006.01)

(52) U.S. Cl.
USPC ............ 717/140; 717/148; 717/153; 717/163

(58) Field of Classification Search
None
See application file for complete search history.

(56) References Cited

U.S. PATENT DOCUMENTS

| | | | |
|---|---|---|---|
| 6,334,210 | B1 | 12/2001 | Miura et al. |
| 2001/0052119 | A1 | 12/2001 | Inaba |
| 2007/0089099 | A1* | 4/2007 | Matsuo et al. ............... 717/136 |
| 2007/0169002 | A1 | 7/2007 | Kronlund et al. |

FOREIGN PATENT DOCUMENTS

| | | |
|---|---|---|
| JP | 6-250877 | 9/1994 |
| JP | 9-101899 | 4/1997 |
| JP | 10-40112 | 2/1998 |
| JP | 11-212837 | 8/1999 |
| JP | 2001-184218 | 7/2001 |
| JP | 2007-109044 | 4/2007 |
| JP | 2007-233805 | 9/2007 |

OTHER PUBLICATIONS

Office Action issued Jul. 30, 2013 in corresponding Japanese Patent Application No. 2011-520717.
Kuniyasu Suzaki et al., "Adaptive Algorithm Selection Method (AASM) on various machines", Information Processing Society of Japan, vol. 93, No. 24, Mar. 1993, pp. 49-56.
K. Suzuki et al., "Benchmark Test ni yoru Library-nai Algorithm Sentaku", 45th Proceedings of the National Meeting of Information Processing Society of Japan, Sep. 28, 1992, pp. 23-24.
International Search Report of PCT/JP2009/062122 mailed Oct. 6, 2009.
Extended European Search Report issued Jul. 10, 2013 in corresponding European Application No. 09846820.0.

(Continued)

*Primary Examiner* — Chuck Kendall
(74) *Attorney, Agent, or Firm* — Staas & Halsey LLP

(57) ABSTRACT

Provided is a computer-readable, non-transitory medium storing an algorithm selection program for selecting one of algorithm among of a plurality of algorithms included in an extension program for executing a predetermined function when a call-out source program calls out the extension program, the algorithm selection program causing an information processing device including a storage device to execute: acquiring, from the storage device, selection information in which a command for calling out the extension program in the call-out source program and the one of algorithm are correlated; and selecting an algorithm for executing the predetermined function based on the acquired selection information.

22 Claims, 18 Drawing Sheets

(56) References Cited

OTHER PUBLICATIONS

Ahmad Faraj et al., "STAR-MPI: Self Tuned Adaptive Routines for MPI Collective Operations", Proceedings of the 20th Annual International Conference on Supercomputing (ICS' 06), Jun. 2006, pp. 199-208.

Edgar Gabriel et al., "Runtime Optimization of Application Level Communication Patterns", International Parallel & Distributed Processing Symposium (IPDPS '07), IEEE, Mar. 2007, 8 pp.

Jelena Pješivac-Grbović et al., "MPI Collective Algorithm Selection and Quadtree Encoding", Parallel Computing, vol. 33, No. 9, Elsevier Publishers, Sep. 2007, pp. 613-623.

Hyacinthe Nzigou Mamadou et al., "A Robust Dynamic Optimization for MPI Alltoall Operation", International Parallel & Distributed Processing Symposium (IPDPS '09), IEEE, May 2009, 15 pp.

Jason Ansel et al., "PetaBricks: A Language and Compiler for Algorithmic Choice", ACM Sigplan Notices, vol. 44, No. 6, May 2009, pp. 38-49.

Paulo Oliveira et al., "SPMD Image Processing on Beowulf Clusters: Directives and Libraries", Proceedings of the International Parallel and Distributed Processing Symposium (IPDPS '03), IEEE, Apr. 2003, 8 pp.

English Translation by Computer of Japanese Patent Publication No. 6-250877, published Sep. 9, 1994 (Ref. AM of IDS filed Dec. 27, 2011).

English Translation by Computer of Japanese Patent Publication No. 2007-233805, published Sep. 13, 2007 (Ref. AG of IDS filed Dec. 27, 2011).

English Translation by Computer of Japanese Patent Publication No. 10-40112, published Feb. 13, 1998 (Ref. AJ of IDS filed Dec. 27, 2011).

English Translation (6 pages) of E. Suzaki et al., "Algorithm Selection in Library by Benchmark Test", Proceedings of 45th National Meeting of Information Processing Society of Japan, Sep. 28, 1992, pp. 23-24.

Office Action mailed Feb. 4, 2014 in corresponding Japanese Application No. 2011-520717.

\* cited by examiner

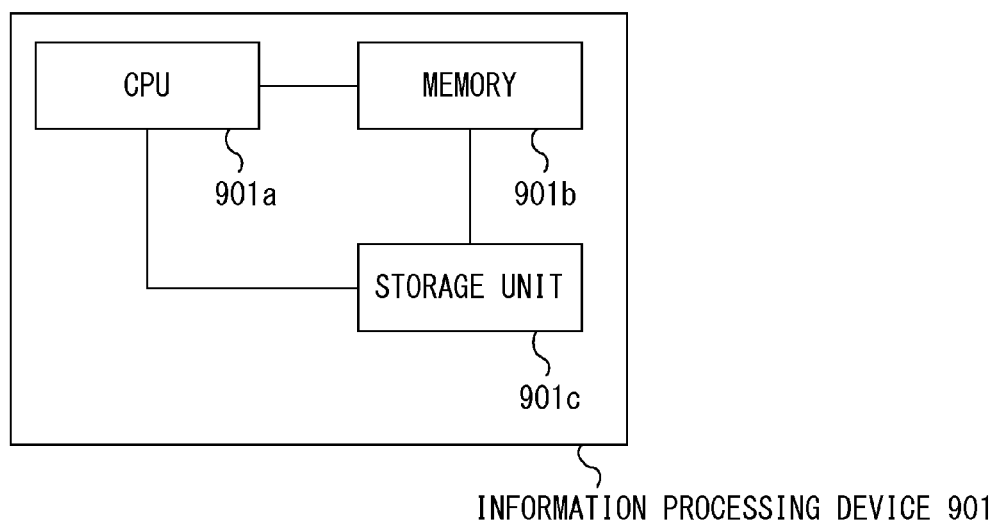
F I G. 1

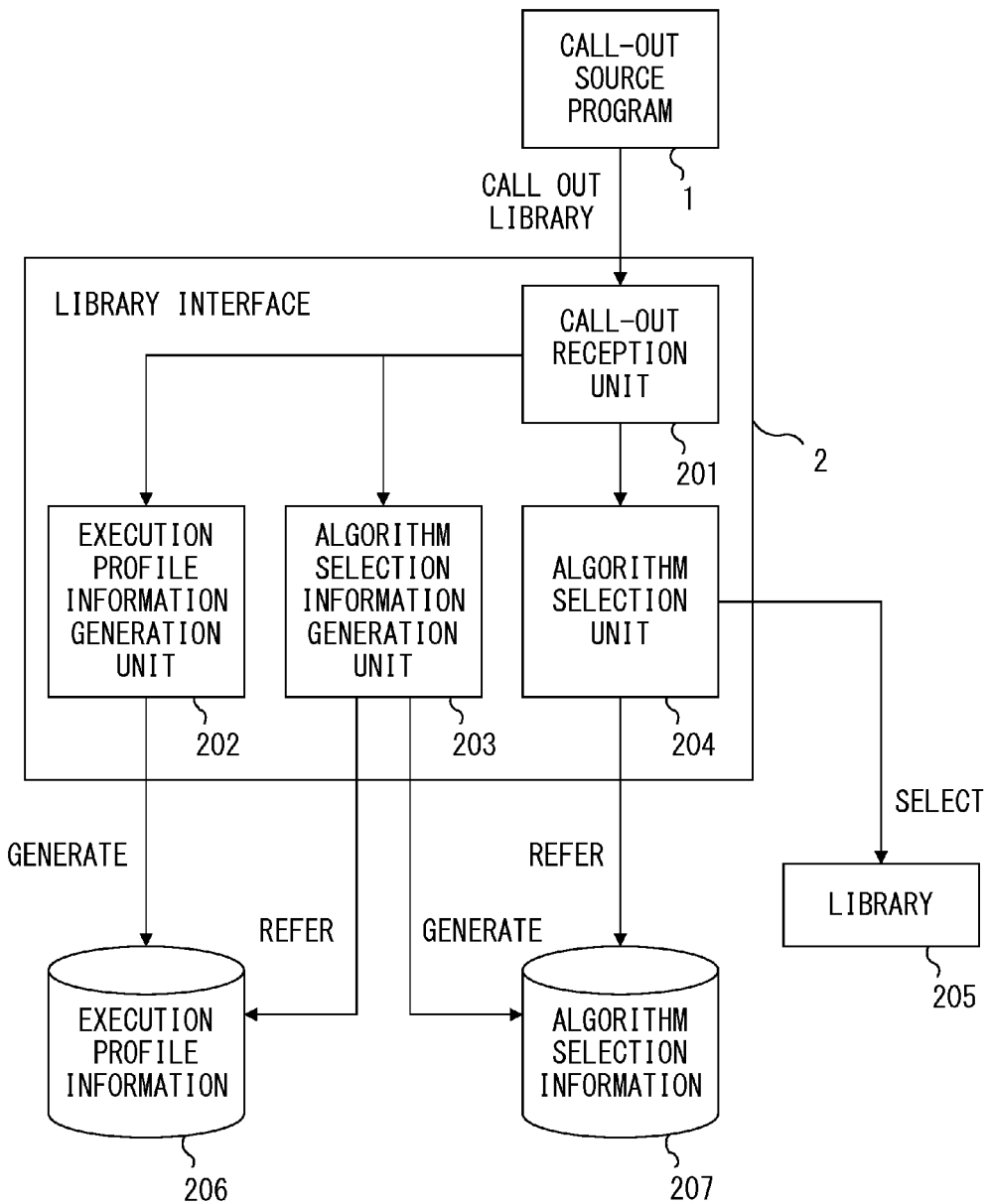
F I G. 2

FIG. 3

| Call-Out Source Command Address | Called Out Library Function | Call-Out Source Program 1 | | | | 206 |
|---|---|---|---|---|---|---|
| | | Use Algorithm 1 | Processing Time 1 | Use Algorithm 2 | Processing Time 2 | |
| 0x100 | MPI_Bcast | Bcast_alg1 | 300 | Bcast_alg2 | 400 | |
| 0x120 | MPI_Send | Send_alg1 | 20 | Send_alg2 | 25 | |
| 0x150 | MPI_Recv | Recv_alg1 | 70 | Recv_alg2 | 40 | |
| 0x200 | MPI_Send | Send_alg1 | 50 | Send_alg2 | 30 | |
| 0x250 | MPI_Recv | Recv_alg1 | 10 | Recv_alg2 | 20 | |
| 0x300 | MPI_Allreduce | Allreduce_alg1 | 650 | Allreduce_alg2 | 500 | |
| 0x900 | MPI_Allreduce | Allreduce_alg1 | 800 | Allreduce_alg2 | 900 | |
| ... | ... | ... | ... | ... | ... | |

| Call-Out Source Program 1 |||
| --- | --- | --- |
| Library Function | Call-Out Source Command Address | Processing Algorithm |
| MPI_Send | 0x100 | Send_alg1 |
| | 0x120 | Send_alg2 |
| MPI_Recv | 0x150 | Recv_alg1 |
| | 0x250 | Recv_alg2 |
| MPI_Bcast | 0x050 | Bcast_alg3 |
| MPI_Allreduce | 0x300 | Allreduce_alg7 |
| | 0x900 | Allreduce_alg4 |
| ... | ... | ... |

207

F I G. 4

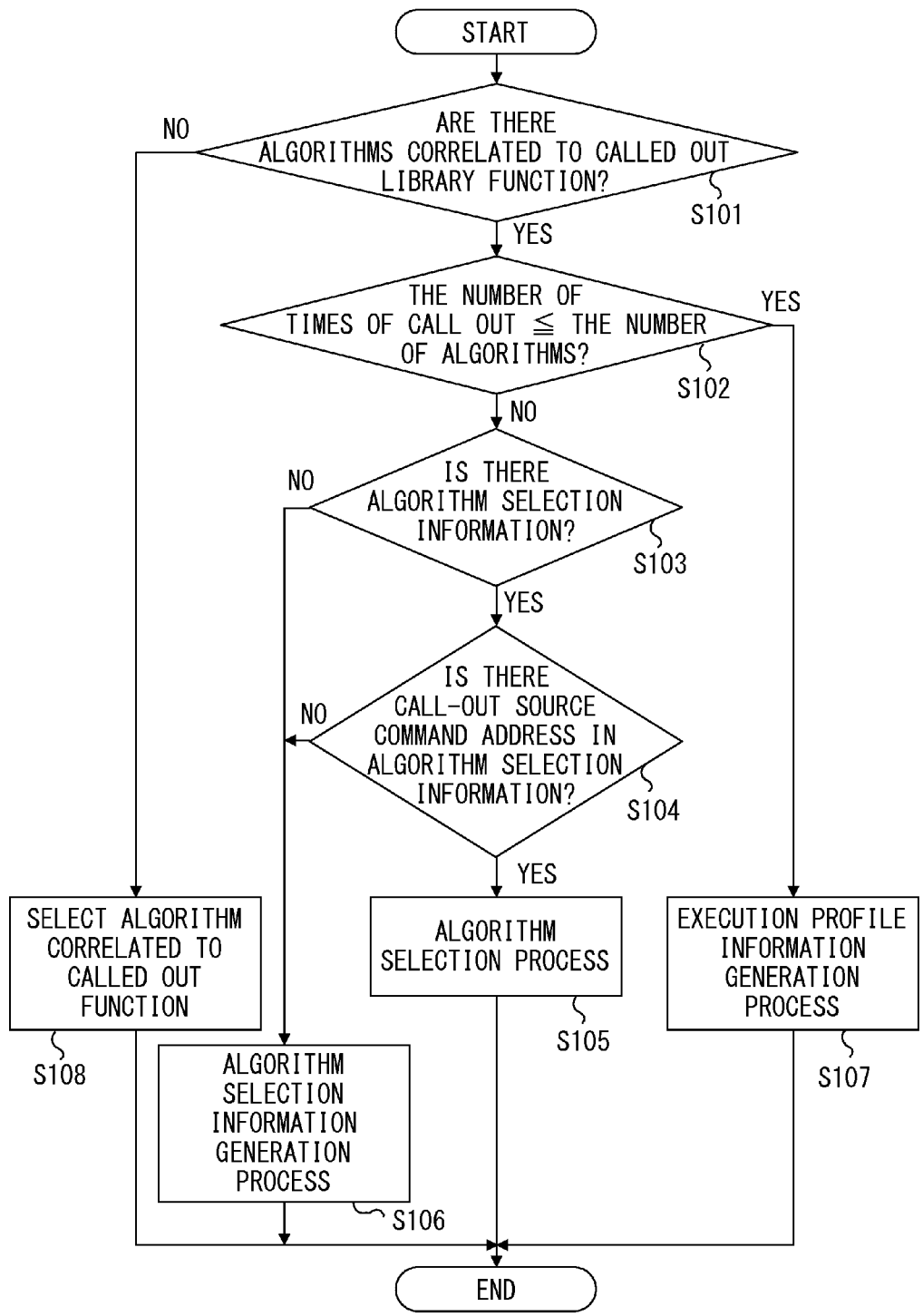
F I G. 5

```
Int
MPI_Secd(...)
{
/*Acquire Call-Out Source Command Address*/
callerAddress=_builtin_return_address(0);
/*Acquire Execution Start Time*/
StartTime=GetTime();
...
...
...
/*Acquire Execution End Time/
endTime=GetTime();
/*Record Call-Out Source Command Address,
Use Algorithm, and Processing Time*/
RecordExecTime(callerAddress, "MPI_Send", algID, endTime-startTime);
return MPI_SUCCESS;
}
```

F I G. 7

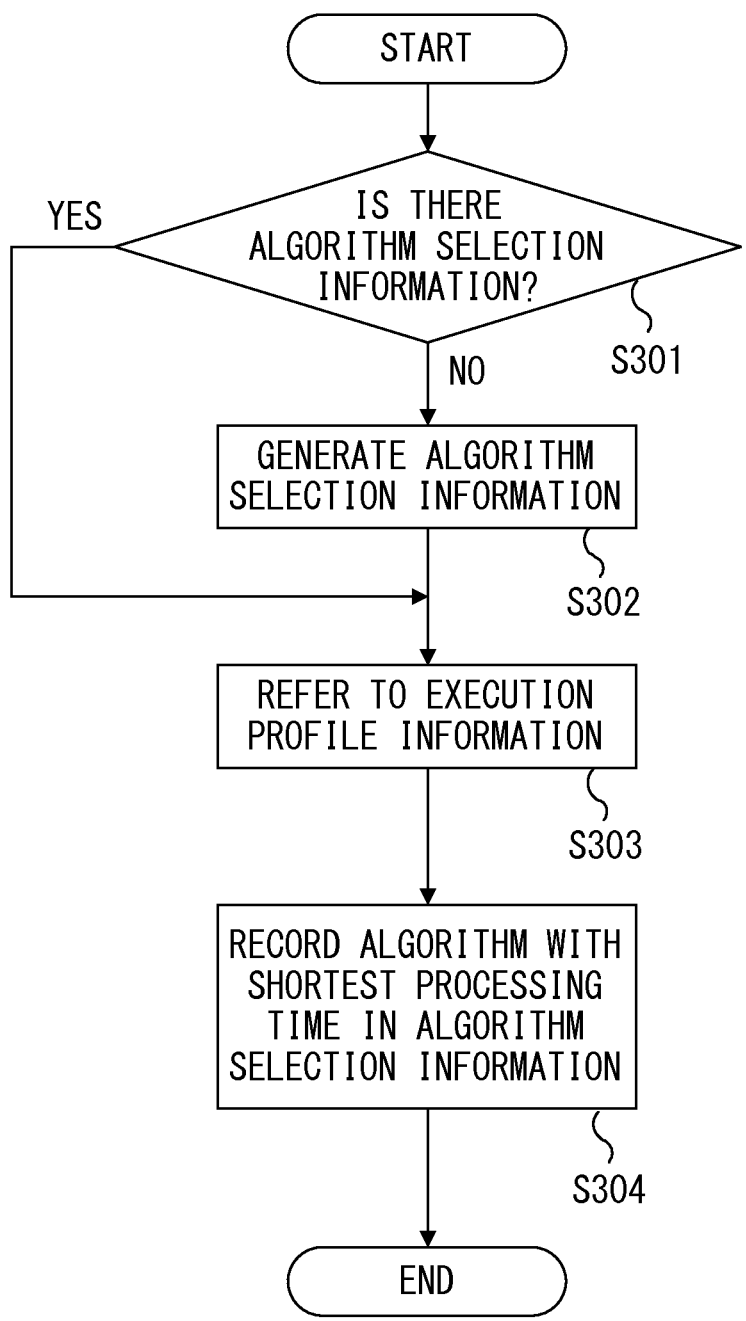
F I G. 8

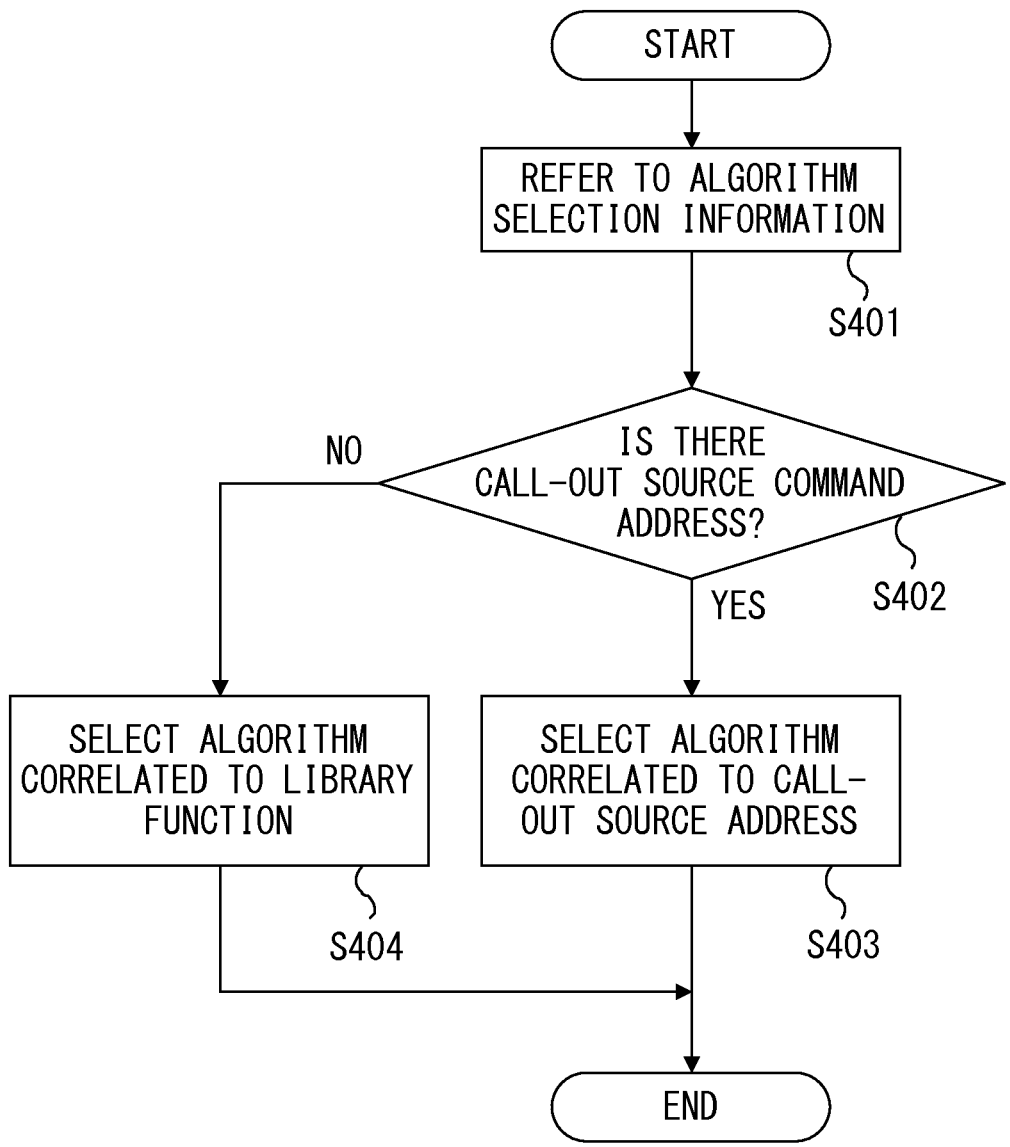
F I G. 9

| Call-Out Source Program 1 |||
|---|---|---|
| Library Function | Call-Out Source Function | Processing Algorithm |
| MPI_Send | func2 | Send_alg1 |
|  | func3 | Send_alg2 |
| MPI_Recv | func2 | Recv_alg1 |
|  | func3 | Recv_alg2 |
| MPI_Bcast | func1 | Bcast_alg3 |
| MPI_Allreduce | func4 | Allreduce_alg7 |
|  | func5 | Allreduce_alg4 |
| ... | ... | ... |

207

F I G. 1 1

| Call-Out Source Program 1 | | |
|---|---|---|
| Library Function | Call-Out Source Command Address Sequence | Processing Algorithm |
| MPI_Send | 0x010, 0x070, 0x100 | Send_alg1 |
| | 0x010, 0x080, 0x120 | Send_alg2 |
| MPI_Recv | 0x010, 0x090, 0x150 | Recv_alg1 |
| | 0x010, 0x040, 0x250 | Recv_alg2 |
| MPI_Bcast | 0x050, 0x050 | Bcast_alg3 |
| MPI_Allreduce | 0x060, 0x400, 0x300 | Allreduce_alg7 |
| | 0x030, 0x700, 0x900 | Allreduce_alg4 |
| ... | ... | ... |

207

Direct Call-Out Source Command Address

Higher-Level Call-Out Source Command Address

F I G. 1 2

| Call-Out Source Program 1 | | | | |
|---|---|---|---|---|
| Library Function | Call-Out Source File Name | Call-Out Source Line Number | Call-Out Source Command Address | Processing Algorithm |
| MPI_Send | comm. c | 80 | 0x100 | Send_alg1 |
| | comm. c | 170 | 0x200 | Send_alg2 |
| MPI_Recv | comm. c | 125 | 0x150 | Recv_alg1 |
| | comm. c | 200 | 0x250 | Recv_alg2 |
| MPI_Bcast | comm. c | 25 | 0x050 | Bcast_alg3 |
| MPI_Allreduce | comm. c | 300 | 0x300 | Allreduce_alg7 |
| | comm. c | 450 | 0x500 | Allreduce_alg4 |
| ... | ... | ... | ... | ... |

207

F I G. 1 3

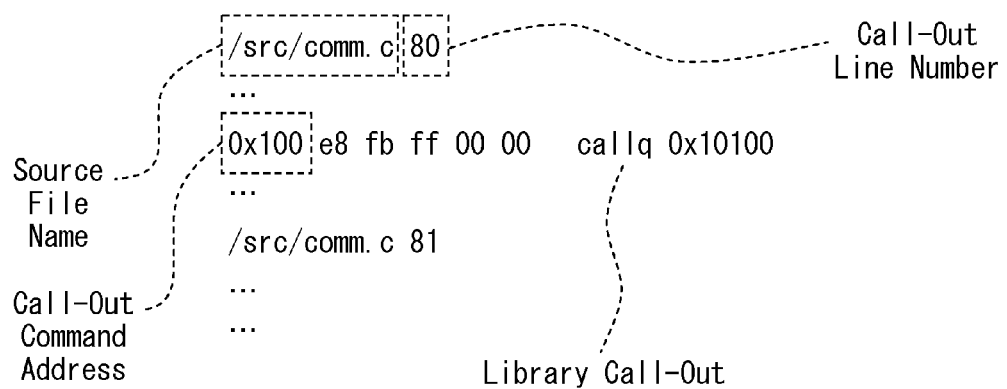
F I G. 1 4

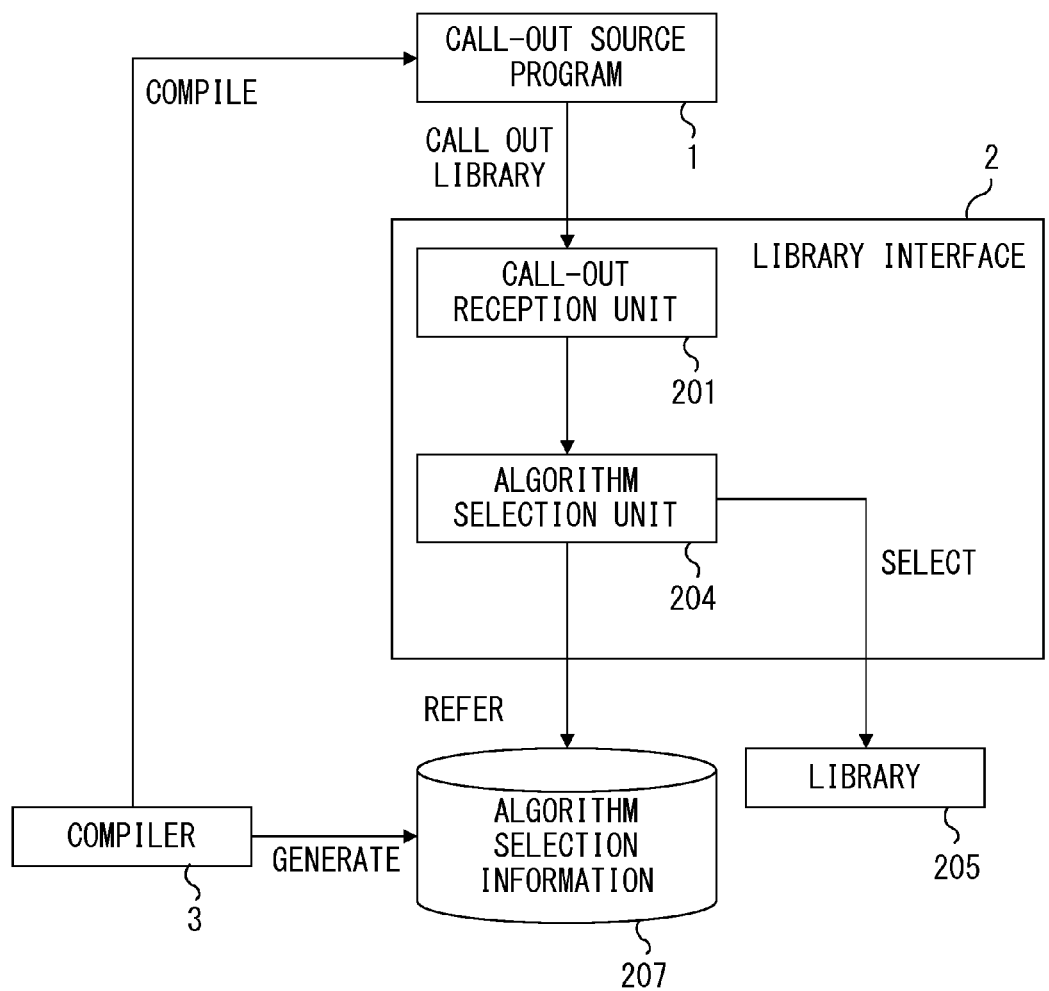
F I G. 16

```
                              Write Information of Algorithm Selection
                                Immediately After MPI_Send Call-Out Int
ExchangeData(...)
{
...
MPI_Send(...);/*$MPI_Send:Send_alg2*/
...
...
MPI_Recv(...);/*$MPI_Recv:Recv_alg1*/
...
...
}
                              Write Information of Algorithm Selection
                                Immediately After MPI_Recv Call-Out
```

F I G. 1 7 ial Application PCT/JP2009/0062122 filed on Jul. 2, 2009

ALGORITHM SELECTION DEVICE AND ALGORITHM SELECTION METHOD

CROSS-REFERENCE TO RELATED APPLICATIONS

This application is a continuation application of International Application PCT/JP2009/0062122 filed on Jul. 2, 2009 and designated the U.S., the entire contents of which are incorporated herein by reference.

FIELD

The present invention relates to an algorithm selection program, an algorithm selection device and an algorithm selection method.

BACKGROUND

In creating a computer program, a library interface, which is an interface for calling out a library, links the library and the computer program so as to import a function provided by the library to the computer program. The library interface is conventionalized as a standard specification in order to realize compatibility with a predetermined standard and to facilitate porting to another platform. An example of the standard specification includes an MPI (Message Passing Interface). Functions provided by the conventionalized library interface are generalized and abstracted to improve the compatibility and the portability. The generalization and abstraction of functions denote providing a plurality of processes executed in the library as one function to a program for using the library. As a result, considering an implementation of more efficient processing of the provided functions, the information obtained by the library interface may not be sufficient in selecting a processing algorithm. For example, the library interface does not provide sufficient information for a requested selection in an access pattern of a file I/O, a communication algorithm in network communication, and the like. More specifically, even if a plurality of algorithms for attaining one processing object are prepared, the library interface does not provide means for selecting the algorithm.

An example of a conventional solution to the problem includes a method in which a program as a call-out source of a library presents additional information called an environment variable to the library. In the method, a creator or an executioner of a call-out source program presents additional information related to an item defined in the implementation of the library. The additional information is provided to the library as an argument upon execution, and as a result, an internal processing algorithm of the library can be changed.

Patent Document 1: Japanese Laid-Open Patent Publication No. 2007-109044
Patent Document 2: Japanese Laid-Open Patent Publication No. 11-212837
Patent Document 3: Japanese Laid-Open Patent Publication No. 9-101899

SUMMARY

According to an aspect of the invention, provided is a computer-readable, non-transitory medium storing an algorithm selection program for selecting one of algorithm among of a plurality of algorithms included in an extension program for executing a predetermined function when a call-out source program calls out the extension program, the algorithm selection program causing an information processing device including a storage device to execute:acquiring, from the storage device, selection information in which a command for calling out the extension program in the call-out source program and the one of algorithm are correlated; and selecting an algorithm for executing the predetermined function based on the acquired selection information.

The object and advantages of the invention will be realized and attained by means of the elements and combinations particularly pointed out in the claims.

It is to be understood that both the foregoing general description and the following detailed description are exemplary and explanatory and are not restricted of the invention, as claimed.

BRIEF DESCRIPTION OF DRAWINGS

FIG. 1 is a diagram illustrating a hardware configuration of a processing device according to a first embodiment.
FIG. 2 illustrates a functional configuration of a library interface according to the first embodiment.
FIG. 3 illustrates execution profile information according to the first embodiment.
FIG. 4 illustrates algorithm selection information according to the first embodiment.
FIG. 5 illustrates an operation for library function call-out by a call-out source program.
FIG. 7 illustrates an acquisition method of a processing time.
FIG. 8 illustrates an operation of an algorithm selection information generation process according to the first embodiment.
FIG. 9 illustrates an operation of an algorithm selection process.
FIG. 11 illustrates algorithm selection information using call-out source functions.
FIG. 12 illustrates algorithm selection information using a call-out source command address sequence.
FIG. 13 illustrates algorithm selection information according to a second embodiment.
FIG. 14 illustrates debug information.
FIG. 16 illustrates a configuration of the library interface and a compiler according to a third embodiment.
FIG. 17 illustrates descriptions for designating an algorithm in a source code of a call-out source program.

DESCRIPTION OF EMBODIMENTS

First Embodiment

Figure 6:
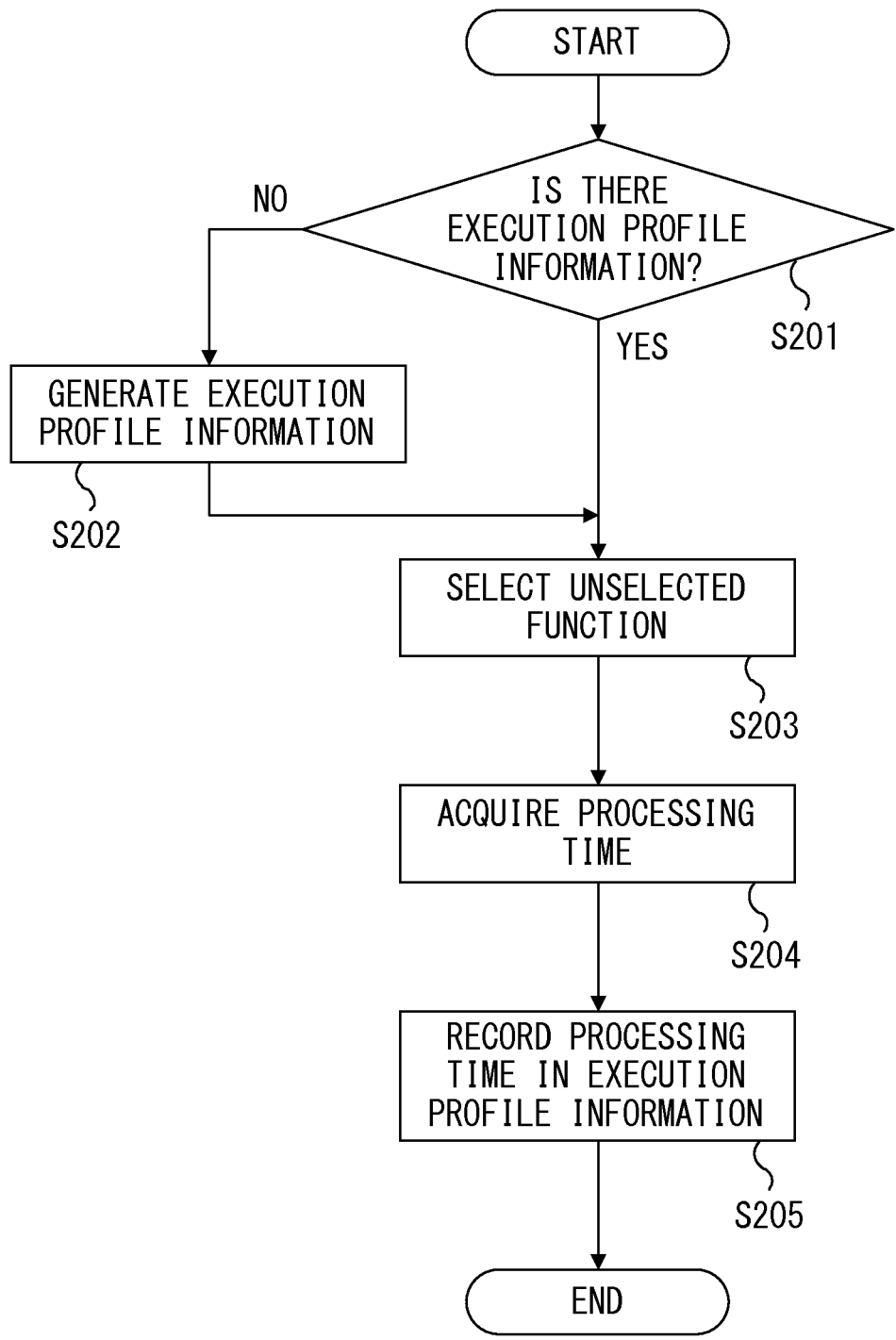
FIG. 6 illustrates an operation of an execution profile information generation process according to the first embodiment.

Hereinafter, the present embodiment will be described with reference to the drawings.

A hardware configuration of a processing device according to the present embodiment will be described. FIG. 1 is a diagram showing a hardware configuration of a processing device according to the present embodiment.

As shown in FIG. 1, a information processing device 901 according to the present embodiment includes a CPU (Central Processing Unit) 901*a*, a memory 901*b*, and a storage unit 901*c*. The information processing device 901 functions as an algorithm selection device that selects an algorithm of a library function described later.

A functional configuration of a library interface according to the present embodiment will be described. FIG. 2 shows a functional configuration of a library interface according to the present embodiment.

As shown in FIG. 2, a library 205 according to the present embodiment receives call-out through a library interface 2. The library interface 2 includes a call-out reception unit 201, an execution profile information generation unit 202, an algorithm selection information generation unit 203, and an algorithm selection unit 204. The call-out reception unit 201 receives a call-out for the library 205 from a call-out source program 1 as a call-out source. The library 205 has a plurality of standardized functions (library functions). The library functions in the library 205 have at least one or more algorithms. The algorithms denote, for example, functions in the library functions. The execution profile information generation unit 202 generates execution profile information 206 described later based on processing times of the algorithms of the library functions acquired by a method described later. The algorithm selection information generation unit 203 generates algorithm selection information 207 described later based on the execution profile information 206. The algorithm selection unit 204 selects an algorithm to be executed in the execution of a library function by library call-out of a call-out source program based on the algorithm selection information 207. The CPU 901a executes and realizes the functions of the call-out reception unit 201, the execution profile information generation unit 202, the algorithm selection information generation unit 203, the algorithm selection unit 204, and the library 205. The execution profile information 206 and the algorithm selection information 207 are stored in the storage unit 901c. Examples of the storage unit 901c include a hard disk and a flash memory. The call-out reception unit 201, the execution profile information generation unit 202, the algorithm selection information generation unit 203, and the algorithm selection unit 204 as a whole function as a library interface for the library 205.

Execution profile information according to the present embodiment will be described. FIG. 3 shows execution profile information according to the present embodiment.

As shown in FIG. 3, the execution profile information 206 is information in which a call-out source command address, a called out library function, a use algorithm 1, a processing time 1, a use algorithm 2, and a communication processing time 2 are correlated as a table. The call-out source command address is an address of a command that has called out a library function in the call-out source program. The called out library function is a library function called out based on the call-out source command address. The use algorithm 1 is an algorithm executed as the library function. The processing time 1 is a processing time based on the use algorithm 1. The use algorithm 2 is an algorithm executed as a library function and is an algorithm different from the use algorithm 1. The processing time 2 is a processing time based on the use algorithm 2. The processing time here denotes, for example, a computation time, a communication time, or a total time of the times based on the use algorithm and is acquired by a method described later. According to the execution profile information 206, a processing time in a combination of the call-out source command address and the algorithm executed as the library function is indicated. The execution profile information 206 is generated for the call-out source program 1.

The algorithm selection information according to the present embodiment will be described. FIG. 4 shows algorithm selection information according to the present embodiment.

As shown in FIG. 4, the algorithm selection information 207 is information in which a library function, a call-out source command address, and a processing algorithm are correlated as a table. The processing algorithm is an algorithm selected for a combination of the library function and the call-out source command address. The algorithm selection information 207 is generated for the call-out source program 1.

An operation for the library function call-out by the call-out source program will be described. FIG. 5 shows an operation for library function call-out by a call-out source program. In FIG. 5, it is assumed that the call-out source program calls out a predetermined library function in the library based on a command of a predetermined address.

As shown in FIG. 5, the call-out reception unit 201 determines whether there are a plurality of algorithms correlated to a library function called out by the call-out source program 1 (S101).

If there are a plurality of algorithms (S101, YES), the call-out reception unit 201 determines, for the call-out source command address, whether the number of times of call-out of the library function is equal to or smaller than the number of algorithms included in the library function (S102).

If the number of algorithms included in the library function is smaller than the number of times of call-out of the library function (S102, NO), the call-out source reception unit 201 determines whether there is the algorithm selection information 207 correlated to the call-out source program 1 (S103).

If there is the algorithm selection information 207 correlated to the call-out source program 1 (S103, YES), the call-out reception unit 201 determines whether there is a call-out source command address in the algorithm selection information 207 (S104).

If there is a call-out source command address in the algorithm selection information 207 (S104, YES), the algorithm selection unit 204 executes an algorithm selection process described later (S105).

Meanwhile, if there is no call-out source command address in the algorithm selection information 207 (S104, NO), the algorithm selection information generation unit 203 executes an algorithm selection information generation process described later (S106).

In step S103, if there is no algorithm selection information 207 correlated to the call-out source program 1 (S103, NO), the algorithm selection information generation unit 203 executes the algorithm selection information generation process described later (S106).

If the number of algorithms included in the library function is equal to or greater than the number of times of call-out of the library function in step S102 (S102, YES), the execution profile information generation unit 202 executes an execution profile information generation process described later (S107).

If there is one algorithm correlated to the library function called out by the call-out source program 1 in step S101 (S101, NO), the algorithm selection unit 204 selects the algorithm correlated to the called out function (S108).

An operation of the execution profile information generation process will be described. FIG. 6 shows an operation of the execution profile information generation process. FIG. 7 shows an acquisition method of a processing time.

As shown in FIG. 6, the execution profile information generation unit 202 determines whether there is the execution profile information 206 correlated to the call-out source program 1 (S201).

If there is no execution profile information 206 correlated to the call-out source program 1 (S201, NO), the execution profile information generation unit 202 generates execution profile information correlated to the call-out source program 1 (S202). The execution profile information generation unit 202 selects one unselected algorithm in the function called out by the call-out source program 1 (S203). The execution profile information generation unit 202 acquires a processing time based on the selected algorithm (S204). The execution profile information generation unit 202 correlates the processing time of the acquired algorithm to the call-out source command address, the function called out by the call-out source program 1, and the selected and executed algorithm and stores the processing time in the execution profile information 206 (S205).

If there is the execution profile information 206 correlated to the call-out source program 1 in step S201 (S201, YES), one unselected algorithm is selected (S203).

An example of the acquisition method of the processing time includes a method shown in FIG. 7. As shown in FIG. 7, the processing time can be acquired by causing all algorithms in the library 205 to acquire the execution start time and the execution end time and to calculate and store the processing time based on the difference between the execution start time and the execution end time. The call-out source command addresses are also acquired at the same time and stored with the use algorithms in the storage unit 901c. It is assumed that the call-out source command addresses, the use algorithms, and the processing times are correlated and stored in the storage unit 901c. As a result, the number of times of call-out and the number of algorithms in relation to the call-out source command address can be compared in step S102. In step S203, the unselected algorithm denotes an algorithm without the processing time stored in the execution profile information 206 among the algorithms correlated to the call-out source command address.

An operation of the algorithm selection information generation process will be described. FIG. 8 shows an operation of the algorithm selection information generation process.

As shown in FIG. 8, the algorithm selection information generation unit 202 determines whether there is the algorithm selection information 207 correlated to the call-out source program 1 (S301).

If there is no algorithm selection information 207 correlated to the call-out source program 1 (S301, NO), the algorithm selection information generation unit 203 generates the algorithm selection information 207 correlated to the call-out source program 1 (S302). The algorithm selection information generation unit 203 refers to the processing times of the use algorithms correlated to the call-out source command addresses in the execution profile information 206 correlated to the call-out source program 1 (S303). The algorithm selection information generation unit 203 stores, in the algorithm selection information 207, the use algorithm with the shortest processing time among the use algorithms correlated to the call-out source command addresses (S304). The algorithm selection information generation unit 202 stores the use algorithm with the shortest processing time as a processing algorithm in the algorithm selection information 207 in association with the function called out by the call-out source program 1 and the call-out source command address.

On the other hand, if there is the algorithm selection information 207 correlated to the call-out source program 1 (S301, YES), the algorithm selection information generation unit 203 refers to the processing times of the use algorithms correlated to the call-out source command addresses (S303).

An operation of the algorithm selection process will be described. FIG. 9 shows an operation of the algorithm selection process.

As shown in FIG. 9, the algorithm selection unit 204 refers to the algorithm selection information 207 correlated to the call-out source program 1 (S401). The algorithm selection unit 204 determines whether there is a call-out source command address that has called out the function in the referenced algorithm selection information 207 (S402).

If there is a call-out source command address that has called out the function (S402, YES), the algorithm selection unit 204 selects the processing algorithm correlated to the call-out source command address that has called out the function in the referenced algorithm selection information 207 (S403).

On the other hand, if there is no call-out source command address that has called out the function (S402, NO), the algorithm selection unit 204 selects the algorithm correlated to the function called out by the call-out source program 1 (S404).

Figure 10:
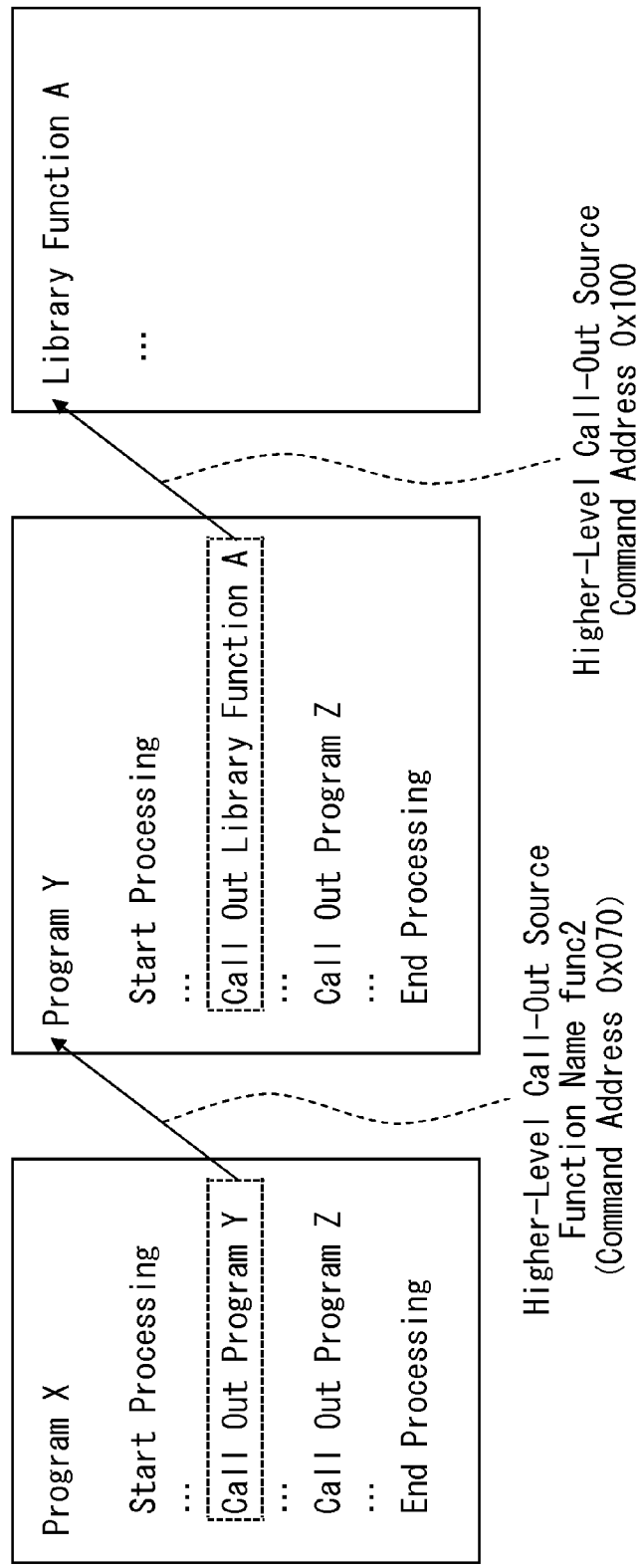
FIG. 10 illustrates a higher-level call-out source command.

As described, the library interface 2 according to the present embodiment acquires the processing times of the use algorithms based on the call-out source commands in the function called out by the call-out source program 1 and selects the algorithm with the shortest processing time. In this way, the function is executed by an algorithm optimal for the call-out source command, and the execution of the library 205 by the call-out source program 1 is optimized. The optimal algorithm may be determined based on, for example, a higher-level call-out source command that calls out the call-out source command or a function including the command. FIG. 10 shows the higher-level call-out source command. FIG. 11 shows algorithm selection information using the call-out source function. FIG. 12 shows algorithm selection information using a call-out source command address sequence.

When a library function A is called out as shown in FIG. 10, the higher-level call-out source command is a command (command address 0x070) that calls out a program Y including a call-out source address 0x100 that actually calls out the library function A. In FIG. 10, a function name including the higher-level call-out source command is func2. To determine the processing algorithm based on the function including the higher-level call-out source command, the algorithm selection information 207 may be stored as a table as shown in FIG. 11. The algorithm selection information 207 shown in FIG. 11 is information correlating the library functions, the call-out source functions, and the processing algorithms. The algorithm selection information 207 may be stored as a table as shown in FIG. 12 if a different algorithm needs to be selected when the higher-level call-out source addresses are different even if the call-out source addresses are the same. The algorithm selection information 207 shown in FIG. 12 is information correlating the library functions, the call-out source command address sequences, and the processing algorithms. The call-out source command address sequence is described so that the level of a command address described further to the left from the direct call-out source command address is higher. In this way, the grading for selecting the algorithm can be changed by changing the process correlated to the processing algorithm within, for example, a range from a process based on a single command to a process based on a plurality of commands in the algorithm selection information 207. The grading for selecting the algorithm is always the same between the execution profile information 206 and the algorithm selection information 207. For example, when the call-out source function is correlated to the processing algorithm in the algorithm selection information 207, the processing time is acquired based on the call-out source function. Therefore, the processing time is correlated to the call-out source function in the execution profile information 206.

In the present embodiment, the number of algorithms for comparing the processing times may be narrowed down in advance. For example, the user of the library 205 may select in advance the algorithms for comparing the processing times based on the summary or the like of the algorithms in the library 205 presented in advance. In this case, a list indicating the algorithms selected by the user may be stored in the storage unit 901c, and the processing times may be compared only for the algorithms indicated in the list. The commands shown in FIG. 7 may be written only in the algorithms to be compared.

Second Embodiment

A library 2 according to the present embodiment is different from the first embodiment in that information related to a source file of the call-out source program is stored in the algorithm selection information. The algorithm selection information according to the present embodiment will be described. FIG. 13 shows the algorithm selection information according to the present embodiment.

Figure 15:
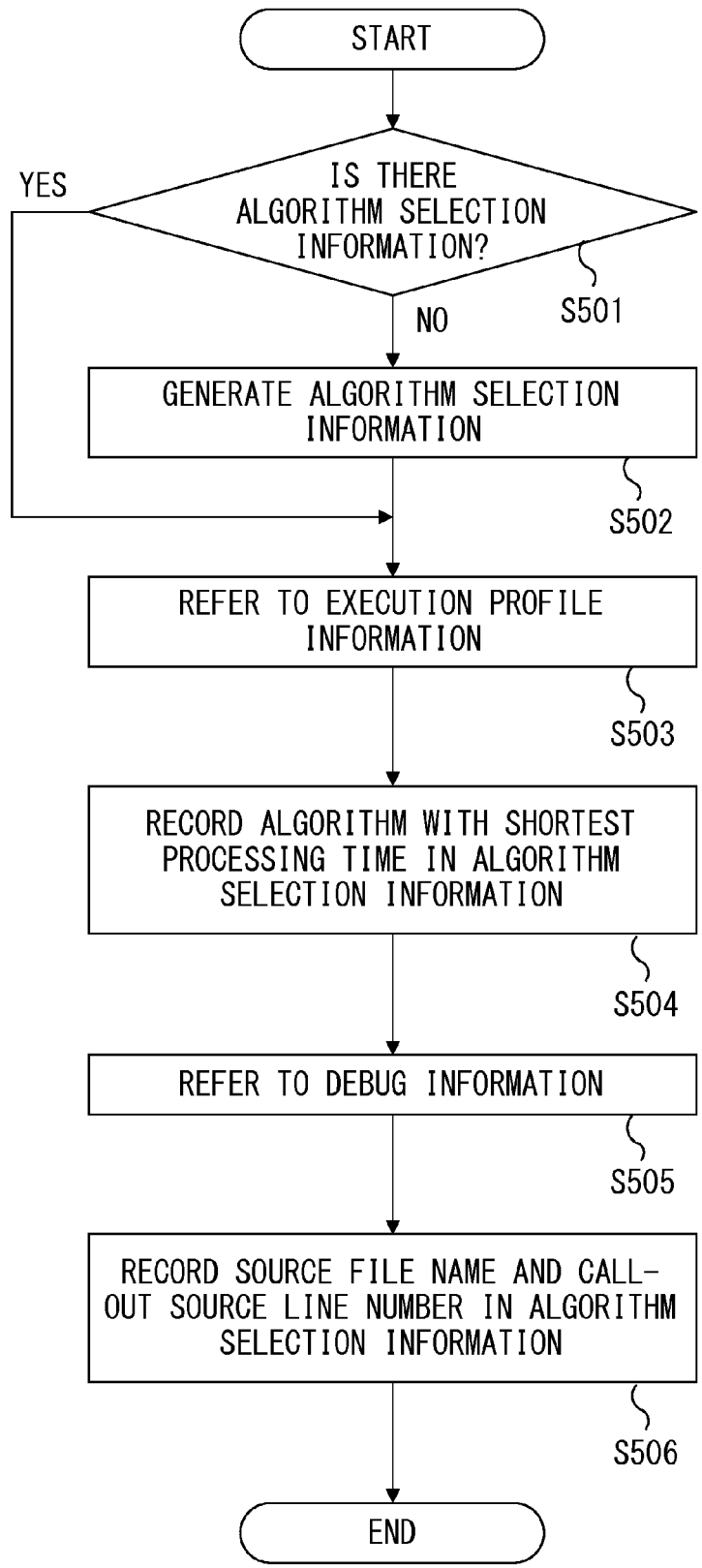
FIG. 15 illustrates an operation of an algorithm selection information generation process according to the second embodiment.

As shown in FIG. 13, the algorithm selection information 207 according to the present embodiment is information correlating and storing call-out source file names and call-out source line numbers in addition to library functions, call-out source command addresses, and processing algorithms. The call-out source file names denote source file names of the call-out source program 1. The call-out source line numbers indicate locations of the call-out source commands in the source files of the call-out source program 1 by line numbers. The algorithm selection information generation unit 203 generates the algorithm selection information 207 based on debug information output by a compiler that compiles the call-out source program 1. Hereinafter, the debug information and an operation of the algorithm selection information generation unit according to the present embodiment will be described. FIG. 14 shows the debug information. FIG. 15 shows an operation of the algorithm selection information generation process according to the present embodiment.

As shown in FIG. 14, for example, the debug information in a DWARF format or the like includes a source file name, a call-out line number, and a call-out command address correlated to the call-out line number. The algorithm selection information generation unit 203 uses the debug information to add information related to the source file to the algorithm selection information 207.

As shown in FIG. 15, the algorithm selection information generation unit 203 determines whether there is the algorithm selection information 207 correlated to the call-out source program 1 (S501).

If there is no algorithm selection information 207 correlated to the call-out source program 1 (S501, NO), the algorithm selection information generation unit 203 generates the algorithm selection information 207 correlated to the call-out source program 1 (S502). The algorithm selection information generation unit 203 refers to the processing times of the use algorithms correlated to the call-out source command addresses in the execution profile information 206 correlated to the call-out source program 1 (S503). The algorithm selection information generation unit 203 stores, in the algorithm selection information 207, the use algorithm with the shortest processing time among the use algorithms correlated to the call-out source command addresses (S504).

The algorithm selection information generation unit 203 refers to the debug information of the source file of the call-out source program 1 (S505). After referring to the debug information, the algorithm selection information generation unit 203 correlates, to the call-out source command address, the call-out line number correlated to the call-out source command address in the debug information and the source file name and stores the call-out source command address in the algorithm selection information 207 (S506).

If there is the algorithm selection information 207 correlated to the call-out source program 1 in step S501 (S501, YES), the algorithm selection information generation unit 203 refers to the processing time of the use algorithm correlated to the call-out source command address (S503).

In this way, the call-out source command address, the call-out line number, and the source file name are correlated. Therefore, the creator of the call-out source program 1 can easily specify the code for calling out the library function in the source file. As a result, the creator can easily recognize and examine the algorithm in the library function. For example, in which source file line a process based on a specific data transfer algorithm is executed, in which subroutine the process is executed, and in which software module the process is executed can be easily examined.

Third Embodiment

In the first and second embodiments, the algorithm selection information generation unit of the library 2 generates the algorithm selection information. In the present embodiment, a compiler generates the algorithm selection information. FIG. 16 shows a configuration of a library interface and a compiler according to the present embodiment.

As shown in FIG. 16, the library interface 2 according to the present embodiment is different from the library interface 2 according to the first and second embodiments in that the execution profile information generation unit 202 and the algorithm selection information generation unit 203 are not included. A compiler 3 includes at least information used to select the algorithm with the shortest processing time when the source code of the call-out source program 1 is compiled. The compiler 3 generates the algorithm selection information 207 based on comprehensive information and information at a high abstraction level in relation to the source code of the call-out source program 1. More specifically, the compiler 3 calculates the processing times of the algorithms based on the source code of the call-out source program 1. An example of the information includes information related to the presence of the data dependence and a method of caching data of other nodes for reference. The compiler 3 additionally generates the algorithm selection information 207 when the call-out source program 1 is compiled, and the library interface 2 selects the algorithm based on the algorithm selection information 207 upon the call-out of the library 205 by the call-out source program 1.

In this way, upon the call-out of the library 205 by the call-out source program 1, both the high processing efficiency and the standard specification can be realized by utilizing, to the maximum extent, useful information that can be extracted from the source code. For example, when the executing binary operated on the distributed memory parallel computer is realized by a parallelizing compiler, there is an issue of realizing an open operating platform and reducing the cost of the software maintenance. Such an issue can be solved by following a standard specification, that is, using a library with standardized executing binary. The determination of whether the standard specification is followed depends on whether the executing binary efficiently operates. According to the library 2 and the compiler 3 of the present embodiment, the call-out source program 1 can efficiently operate using the library 2 without acquiring the processing time when the library 205 is actually called out and executed.

If the compiler used to compile the source code is formed by a plurality of components, such as a back-end compiler and an assembler, the algorithm selection information 207 provided with the line numbers shown in the second embodiment may be used.

The creator of the call-out source program 1 can designate an algorithm by including, in the source code, a description indicating the algorithm to be executed for a function to be called out. FIG. 17 shows a description for designating an algorithm in the source code of the call-out source program.

As shown in FIG. 17, the creator of the call-out source program 1 writes a code for designating the algorithm in, for example, a comment format immediately after the command for calling out the function. The compiler 3 correlates the algorithm designated by the description and the command immediately before the description to generate the algorithm selection information 207. The compiler 3 may automatically embed the description to the source code based on the algorithm selection information 207 provided with the line numbers shown in the second embodiment. As a result, an algorithm with a short processing time is selected, and at the same time, the creator can check which algorithm is selected for the call-out command just by looking at the source code.

Figure 18:
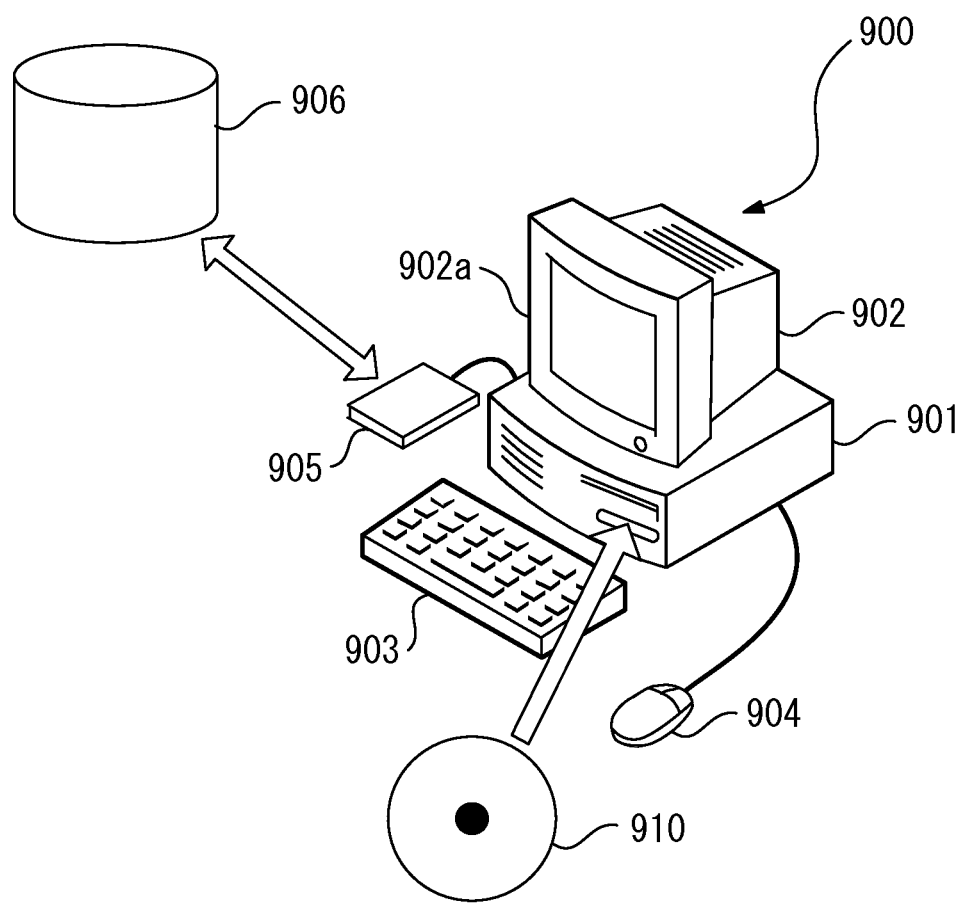
FIG. 18 is a diagram illustrating an example of a computer system to which the present invention is applied.

The present invention can be applied to a computer system as shown below. FIG. 18 is a diagram showing an example of a computer system to which the present invention is applied. A computer system 900 shown in FIG. 18 includes: a main body (information processing device) 901 including a CPU 901a, a disk drive, and the like; a display 902 that displays an image based on an instruction from the main body 901; a keyboard 903 for inputting various information to the computer system 900; a mouse 904 for designating an arbitrary position on a display screen 902a of the display 902; and a communication device 905 that accesses an external database and the like to download a program and the like stored in another computer system. A network communication card, a modem, and the like can be the communication device 905.

A program for causing the computer system that forms the algorithm selection device to execute steps described above can be provided as an algorithm selection program. The program can be stored in a recording medium readable by the computer system to cause the computer system that forms the algorithm selection device to execute the program. The program for executing steps described above is stored in a portable recording medium such as a disk 910 or downloaded by the communication device 905 from a recording medium 906 of another computer system. An algorithm selection program (algorithm selection software) for providing at least an algorithm selection function to the computer system 900 is input and compiled on the computer system 900. The program causes the computer system 900 to operate as an algorithm selection device with an algorithm selection function. The program may be stored in a computer-readable recording medium such as the disk 910. Examples of the recording medium readable by the computer system 900 include internal storage devices implemented inside the computer such as a ROM and a RAM, portable storage media such as the disk 910, a flexible disk, a DVD disk, a magneto-optical disk, and an IC card, a database that holds computer programs, another computer system, a database of the computer system, and various recording media accessible by a computer system connected through communication means such as the communication device 905.

The present invention can be implemented in various other forms without departing from the scope or main features of the present invention. Therefore, the embodiments are to be considered in all aspects as illustrative and not restrictive. The scope of the present invention is indicated by the claims and is not limited by the specification. Furthermore, all modifications, various improvements, replacements, and refinements belonging to the range of equivalency of the claims are within the scope of the present invention.

What is claimed is:

1. A computer-readable, non-transitory medium storing an algorithm selection program for selecting one algorithm among a plurality of algorithms corresponding to a library function included in an extension program for extending the library function when a call-out source program calls out the extension program, the algorithm selection program causing an information processing device including a storage device to execute a method comprising:

generating execution profile information based on an algorithm with a shortest processing time among the plurality of algorithms corresponding to the extension program called out by the call-out source program, and first command specifying information that specifies a command calling out the extension program, when the library function corresponds to the plurality of algorithms and a number of the algorithms corresponding to the library function is at least equal to a number of times of call-out of the library function;

acquiring, from the storage device, selection information in which one of the algorithms and second command specifying information that specifies the command calling out the extension program in the source program are correlated for each of the algorithms; and selecting the one algorithm corresponding to the library function based on the generated execution profile information and the acquired selection information.

2. The computer-readable, non-transitory medium according to claim 1, wherein the first command specifying information that specifies the command calling out the extension program correlated to the one algorithm in the selection information specifies a function including a command for directly calling out the extension program or a command for calling out the command upon execution, and the selecting comprises selecting an algorithm correlated to the function in the selection information.

3. The computer-readable, non-transitory medium according to claim 1, wherein the first command specifying information that specifies the command calling out the extension program correlated to the one algorithm in the selection information specifies a combination of a command for directly calling out the extension program and a command for calling out the command upon execution, and the selecting comprises selecting an algorithm correlated to the combination in the selection information.

4. The computer-readable, non-transitory medium according to claim 1, the algorithm selection program further causing the processing device to execute generating the selection information and storing the selection information in the storage unit based on an algorithm with the shortest processing time among the processing times of the plurality of algorithms included in the extension program called out in advance by the call-out source program and based on the command that has called out the extension program.

5. The computer-readable, non-transitory medium according to claim 1, wherein the storing comprises adding a line number, which is correlated to the command for calling out the extension program in a source code of the call-out source program, to the first command specifying information that specifies the command calling out the extension program in the selection information based on debug information output by a compiler in compiling of the source code of the call-out source program.

6. The computer-readable, non-transitory medium according to claim 1, wherein the selection information is generated by the compiler that compiles the source code and is stored in the storage unit based on the source code of the call-out source program.

7. The computer-readable, non-transitory medium according to claim 6, wherein
the source code of the call-out source program includes a description indicating the algorithm to be executed in the call-out of the extension program, and
the compiler generates the selection information based on the description included in the source code.

8. An algorithm selection device that selects one algorithm corresponding to a library function among a plurality of algorithms included in an extension program for extending the library function when a call-out source program calls out the extension program, the algorithm selection device comprising:
a generation unit that generates execution profile information based on an algorithm with a shortest processing time among the plurality of algorithms corresponding to the extension program called out by a source program, and first command specifying information that specifies a command calling out the extension program, when the library function corresponds to the plurality of algorithms and a number of the algorithms corresponding to the library function is at least equal to a number of times of call-out of the library function;
an acquisition unit that acquires selection information in which one of the algorithms and second command specifying information that specifies the command calling out the extension program in the source program are correlated for each of the algorithms; and
a selection unit that selects the one algorithm corresponding to the library function based on the generated execution profile information and the acquired selection information.

9. The algorithm selection device according to claim 8, wherein
the first command specifying information that specifies the command calling out the extension program correlated to the one algorithm in the selection information specifies a function including a command for directly calling out the extension program or a higher-level command for calling out the command upon execution, and
the selection unit selects an algorithm correlated to the function in the selection information.

10. The algorithm selection device according to claim 8, wherein
the first command specifying information that specifies the command calling out the extension program correlated to the one algorithm in the selection information specifies a combination of a command for directly calling out the extension program and a command for calling out the command upon execution, and the selection unit selects an algorithm correlated to the combination in the selection information.

11. The algorithm selection device according to claim 8, further comprising a generation unit that generates the selection information based on an algorithm with the shortest processing time among the processing times of the plurality of algorithms included in the extension program called out in advance by the call-out source program and based on the command that has called out the extension program.

12. The algorithm selection device according to claim 11, wherein the generation unit adds a line number, which is correlated to the command for calling out the extension program in a source code of the call-out source program, to the first command specifying information that specifies the command calling out the extension program in the selection information based on debug information output by a compiler in compiling of the source code of the call-out source program.

13. The algorithm selection device according to claim 8, wherein the selection information is generated by the compiler that compiles the source code based on the source code of the call-out source program.

14. The algorithm selection device according to claim 13, wherein
the source code of the call-out source program includes a description indicating the algorithm to be executed in the call-out of the extension program, and
the compiler generates the selection information based on the description included in the source code.

15. An algorithm selection device that selects one algorithm corresponding to a library function among a plurality of algorithms included in an execution program for extending the library function when a call-out source program calls out the extension program, the algorithm selection device comprising:
a call-out unit that uses a command to call out the extension program;
a generation unit that generates execution profile information based on an algorithm with a shortest processing time among the plurality of algorithms corresponding to the extension program called out by a source program, and first command specifying information that specifies a command calling out the extension program, when the library function corresponds to the plurality of algorithms and a number of the algorithms corresponding to the library function is at least equal to a number of times of call-out of the library function;
an acquisition unit that acquires selection information in which one of the algorithms and second command specifying information that specifies the command calling out the extension program in the source program are correlated for each of the algorithms; and
a selection unit that selects the one algorithm corresponding to the library function based on the generated execution profile information and the acquired selection information.

16. An algorithm selection method of selecting one algorithm corresponding a library function among a plurality of algorithms included in an extension program for extending the library function when a call-out source program calls out the extension program, the algorithm selection method comprising:
generating execution profile information based on an algorithm with a shortest processing time among the plurality of algorithms corresponding to the extension program called out by the call-out source program, and first command specifying information that specifies a command calling out the extension program, when the library function corresponds to the plurality of algorithms and a number of the algorithms corresponding to the library function is at least equal to a number of times of call-out of the library function;

acquiring, from the storage device, selection information in which one of the algorithms and second command specifying information that specifies the command calling out the extension program in the source program are correlated for each of the algorithms; and selecting the one algorithm corresponding to the library function based on the generated execution profile information and the acquired selection information.

17. The algorithm selection method according to claim 16, wherein the first command specifying information that specifies the command calling out the extension program correlated to the one algorithm in the selection information specifies a function including a command for directly calling out the extension program or a command for calling out the command upon execution, and the selecting comprises selecting an algorithm correlated to the function in the selection information.

18. The algorithm selection method according to claim 16, wherein the first command specifying information that specifies the command calling out the extension program correlated to the one algorithm in the selection information specifies a combination of a command for directly calling out the extension program and a higher-level command for calling out the command upon execution, and the selecting comprises selecting an algorithm correlated to the combination in the selection information.

19. The algorithm selection method according to claim 16, further causing the processing device to execute generating information and storing the selection information in the storage unit based on an algorithm with the shortest processing time among the processing times of the plurality of algorithms included in the extension program called out in advance by the call-out source program and based on the command that has called out the extension program.

20. The algorithm selection method according to claim 19, wherein the storing comprises adding a line number, which is correlated to the command for calling out the extension program in a source code of the call-out source program, to the command for calling out the extension program in the selection information based on debug information output by a compiler in compiling of the source code of the call-out source program.

21. The algorithm selection device according to claim 9, wherein the selection information is generated by the compiler that compiles the source code based on the source code of the call-out source program.

22. The algorithm selection device according to claim 10, wherein the selection information is generated by the compiler that compiles the source code based on the source code of the call-out source program.

* * * * *